(12) United States Patent
Lee et al.

(10) Patent No.: US 10,609,276 B2
(45) Date of Patent: Mar. 31, 2020

(54) ELECTRONIC DEVICE AND METHOD FOR CONTROLLING OPERATION OF CAMERA-RELATED APPLICATION BASED ON MEMORY STATUS OF THE ELECTRONIC DEVICE THEREOF

(71) Applicant: Samsung Electronics Co., Ltd., Gyeonggi-do (KR)

(72) Inventors: Wooyong Lee, Gyeonggi-do (KR); Beomjoon Kwon, Gyeonggi-do (KR); Jaeyoel Park, Gyeonggi-do (KR); Junyoung Park, Gyeonggi-do (KR); Kihuk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 368 days.

(21) Appl. No.: 15/432,079

(22) Filed: Feb. 14, 2017

(65) Prior Publication Data

US 2017/0244890 A1 Aug. 24, 2017

(30) Foreign Application Priority Data

Feb. 19, 2016 (KR) .................... 10-2016-0019958

(51) Int. Cl.
| | |
|---|---|
| *H04N 7/18* | (2006.01) |
| *H04N 5/232* | (2006.01) |
| *H04N 5/225* | (2006.01) |
| *H04N 5/907* | (2006.01) |
| *H04N 5/77* | (2006.01) |

(52) U.S. Cl.
CPC ....... *H04N 5/23216* (2013.01); *H04N 5/2257* (2013.01); *H04N 5/23229* (2013.01); *H04N 5/23245* (2013.01); *H04N 5/772* (2013.01); *H04N 5/907* (2013.01); *H04N 5/23293* (2013.01)

(58) Field of Classification Search
CPC ................................................ H04N 5/23216
USPC ........................................................ 348/143
See application file for complete search history.

(56) References Cited

U.S. PATENT DOCUMENTS

| | | | | |
|---|---|---|---|---|
| 6,564,004 | B1 * | 5/2003 | Kadono | H04N 5/783 386/314 |
| 9,158,604 | B1 * | 10/2015 | Christodorescu | G06F 9/54 |
| 9,288,374 | B1 * | 3/2016 | Cooper | H04N 5/232 |
| 2006/0262365 | A1 * | 11/2006 | Imao | H04N 5/232 358/527 |
| 2007/0258702 | A1 * | 11/2007 | Sugio | H04N 9/7921 386/353 |
| 2007/0268965 | A1 * | 11/2007 | Alfonso | H04N 7/0105 375/240.01 |
| 2009/0091554 | A1 * | 4/2009 | Keam | G06F 3/0421 345/175 |
| 2009/0103609 | A1 * | 4/2009 | Jiang | H04N 19/152 375/240.03 |

(Continued)

*Primary Examiner* — Leron Beck
(74) *Attorney, Agent, or Firm* — Cha & Reiter, LLC

(57) ABSTRACT

An electronic device may include a display, a camera module, a processor electrically coupled to the display and the camera module, and a memory electrically coupled to the processor. The memory may store instructions executed by the processor to monitor a state of the electronic device and control execution of a camera-related application based on at least one portion of a result of monitoring the state.

19 Claims, 11 Drawing Sheets

(56) References Cited

U.S. PATENT DOCUMENTS

| | | | |
|---|---|---|---|
| 2012/0045103 A1* | 2/2012 | Salsman | G01N 15/1012 |
| | | | 382/128 |
| 2012/0057062 A1* | 3/2012 | Hamada | G02B 7/102 |
| | | | 348/333.02 |
| 2013/0304869 A1* | 11/2013 | Gupta | G06F 9/541 |
| | | | 709/219 |
| 2015/0227864 A1 | 8/2015 | Payne et al. | |
| 2017/0078543 A1* | 3/2017 | Lee | G02F 1/15 |

* cited by examiner

ELECTRONIC DEVICE AND METHOD FOR CONTROLLING OPERATION OF CAMERA-RELATED APPLICATION BASED ON MEMORY STATUS OF THE ELECTRONIC DEVICE THEREOF

CLAIM OF PRIORITY

This application claims the benefit under 35 U.S.C. § 119(a) of Korean patent application filed on Feb. 19, 2016 in the Korean Intellectual Property Office and assigned Serial number 10-2016-0019958, the entire disclosure of which is hereby incorporated by reference.

TECHNICAL FIELD

Various embodiments of the present disclosure relate to an electronic device and a method for controlling an operation of a camera-related application by considering a terminal state or a surrounding environment.

BACKGROUND

Recently, various electronic devices such as a smartphone, tablet PC (Personal Computer), PMP (Portable Multimedia Player), PDA (Personal Digital Assistant), laptop PC (Laptop Personal Computer), and wearable devices provide various functions such as a Social Network Service (SNS), Internet, multimedia, photo/video capture and play, and documentation, as well as a telephone function.

In particular, the displays of mobile electronic devices are developing into a WVGA class or a full-HD class in accordance with the popularization of electronic devices that have a super high resolution display module, similar to a HDTV. Further, cameras included in the electronic devices support capturing of a high resolution image or video.

However, the amount of memory used by an electronic device for camera operations increases because of an increase in the amount of data utilized for processing the operations. Accordingly, if a camera operates indiscriminately without considering the state of an electronic device, smooth functioning of the electronic device may be hindered, causing stoppages or delays in the operations of the electronic device.

SUMMARY

Various embodiments of the present disclosure provide an electronic device and a method for controlling an operation of the electronic device in order to control a camera operation process according to a state of the electronic device or a surrounding environment.

In one aspect of the disclosure, an electronic device may include a display, a camera module, a processor electrically coupled to the display and the camera module, and a memory electrically coupled to the processor. The memory may store instructions executable by the processor to monitor a state of the electronic device and control execution of a camera-related application based on at least one portion of a result of the monitoring.

In one aspect of the disclosure, a method for controlling an operation of an electronic device may include monitoring a state of the electronic device and controlling execution of a camera-related application based on at least one portion of a result of the monitoring.

In one aspect of the disclosure, an electronic device and a method for controlling an operation thereof is disclosed, including utilizing a memory efficiently according to a state of an electronic device or a surrounding environmental condition while initiating or executing a camera-related application.

In one aspect of the disclosure, the electronic device and the method for controlling an operation thereof can provide a seamless operation of the electronic device by controlling a camera operating process according to a contextual situation of the electronic device.

In one aspect of the disclosure, the electronic device and the method for controlling an operation according to various embodiments of the present disclosure can optimize use of resources within the electronic device according to a state of the terminal or a surrounding environmental condition while using a camera.

BRIEF DESCRIPTION OF THE DRAWINGS

The embodiments of the present disclosure will be more apparent from the following description taken in conjunction with the accompanying drawings, in which.

DETAILED DESCRIPTION

Figure 1:
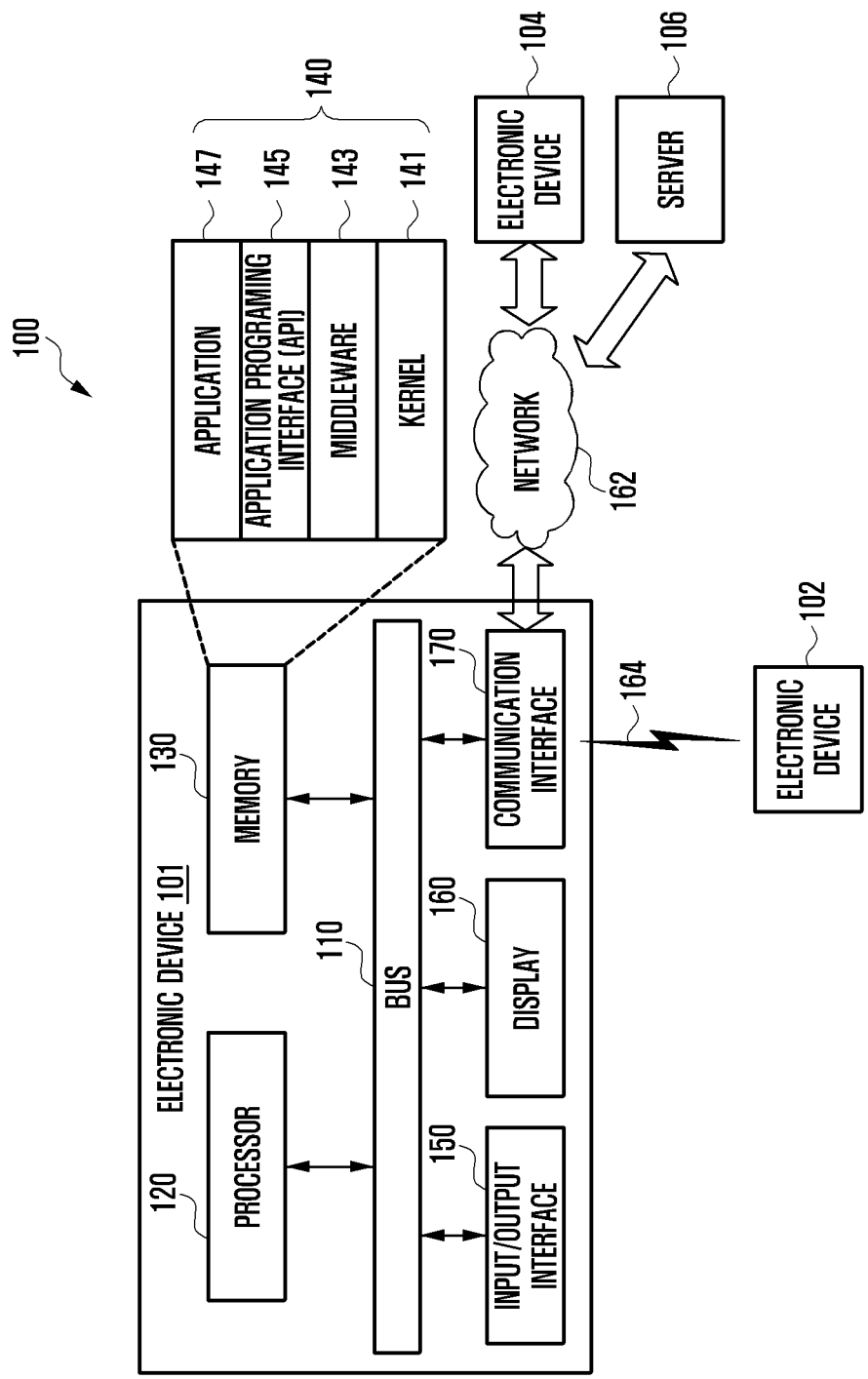
FIG. 1 illustrates an electronic device in a network environment according to various embodiments of the present disclosure.

Hereinafter, example embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are examples and not to be considered as a limitation of this disclosure.

FIG. 1 is a block diagram 100 illustrating an electronic apparatus according to an embodiment of the present disclosure.

Referring to FIG. 1, the electronic apparatus 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 106 via a connection 164 or a network 162. The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
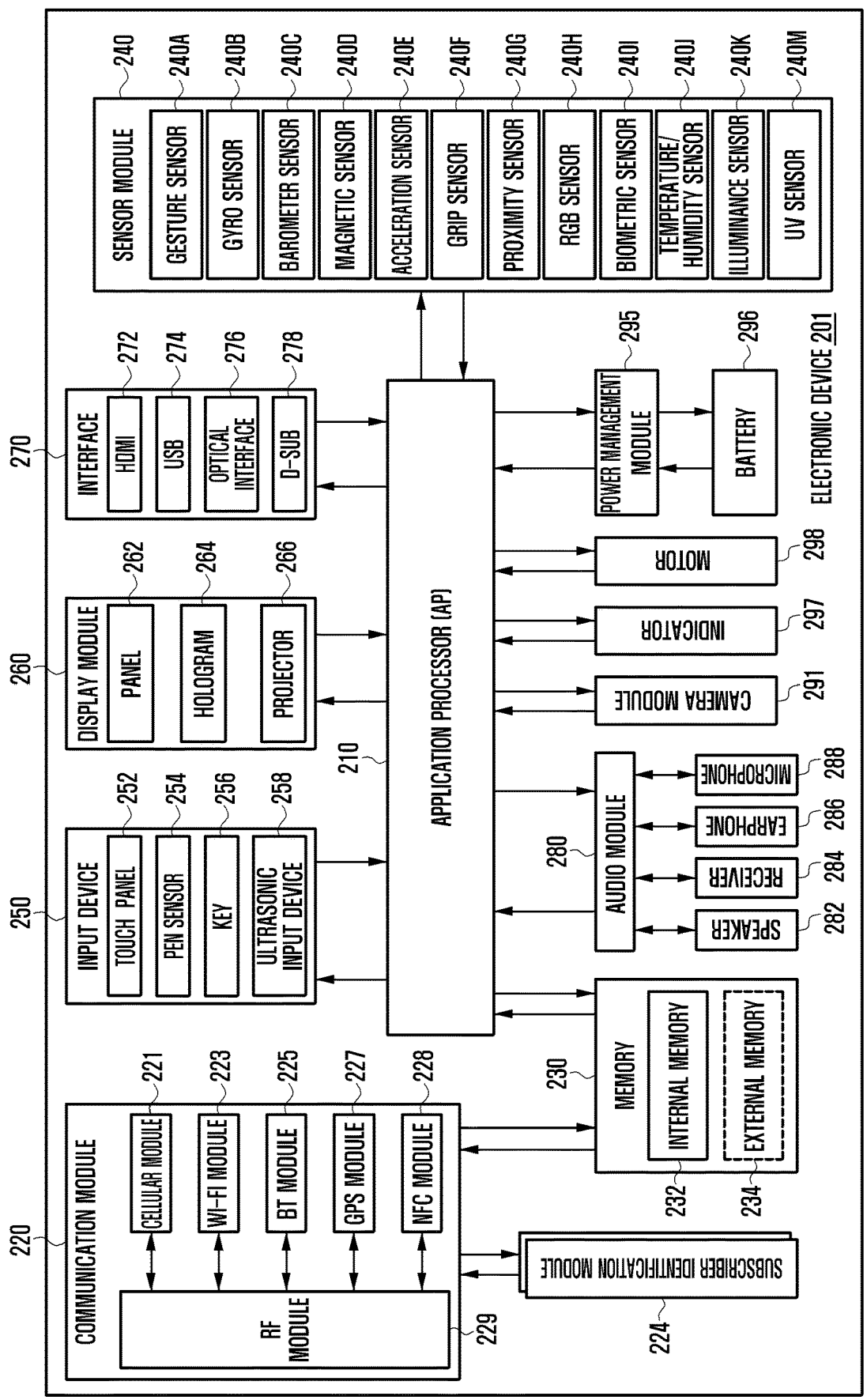
FIG. 2 is a block diagram illustrating a configuration of an electronic device according to various embodiments of the present disclosure.

FIG. 2 is a block diagram illustrating an electronic device 201 in accordance with an embodiment of the present disclosure. The electronic device 201 may form, for example, the whole or part of the electronic device 201 shown in FIG. 1. Referring to FIG. 2, the electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 3, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

Figure 3:
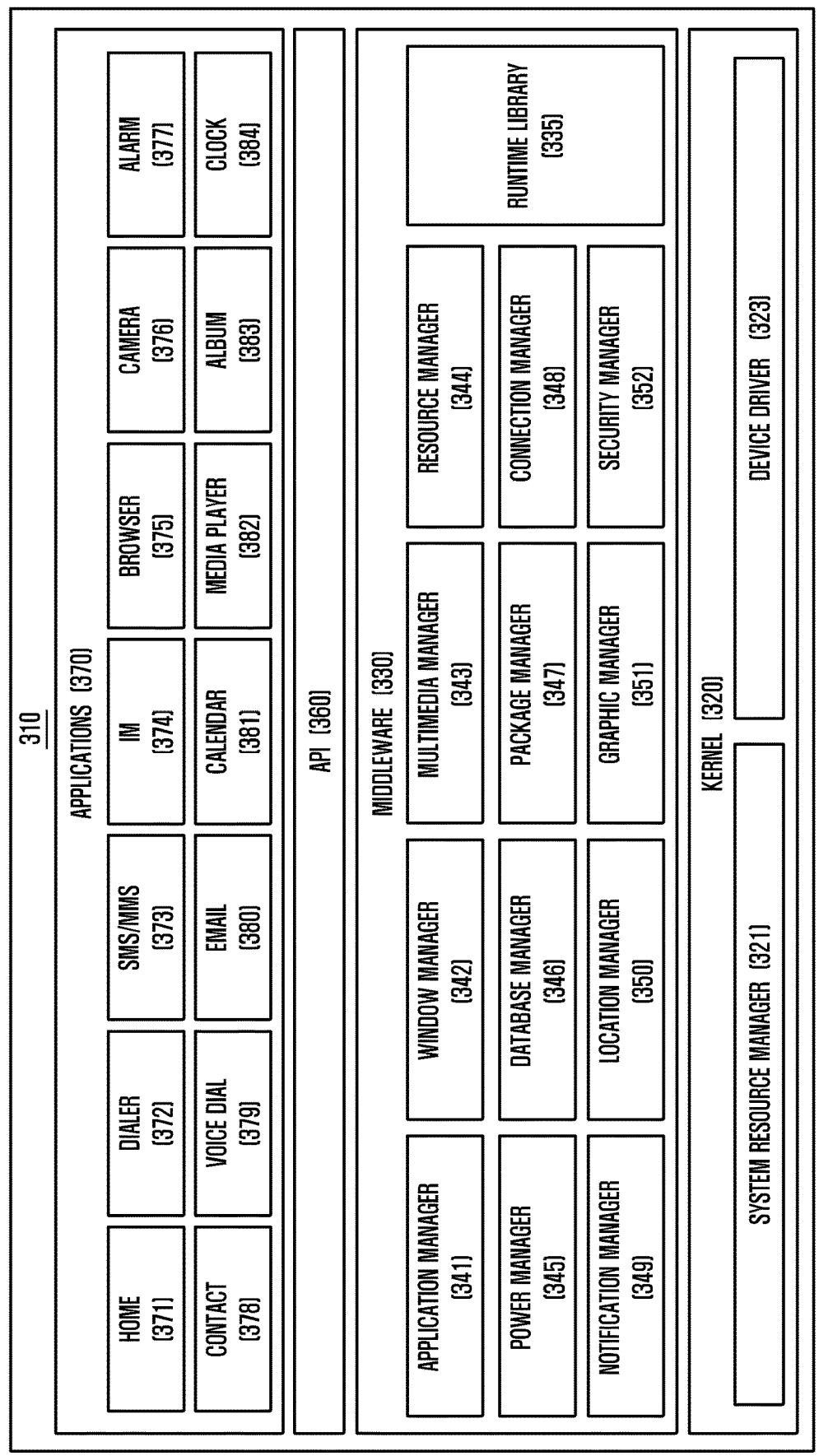
FIG. 3 is a block diagram illustrating a configuration of a program module according to various embodiments of the present disclosure.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 3 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 334 may be functionally connected to the electronic device 201 through various interfaces. According to an embodiment, the electronic device 301 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric (barometric) sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., a display part of the input/output interface 150) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 301 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

FIG. 3 is a block diagram illustrating a configuration of a programming module 310 according to an embodiment of the present disclosure.

The programming module 310 may be included (or stored) in the electronic device 301 (e.g., the memory 230) illustrated in FIG. 1 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 211) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 435 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 411 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 230. At least a part of the programming module 310 may be implemented (e.g., executed) by, for example, the one or more processors. At least a part of the programming module 310 may include, for example, a module, a program, a routine, a set of instructions, and/or a process for performing one or more functions.

Figure 4:
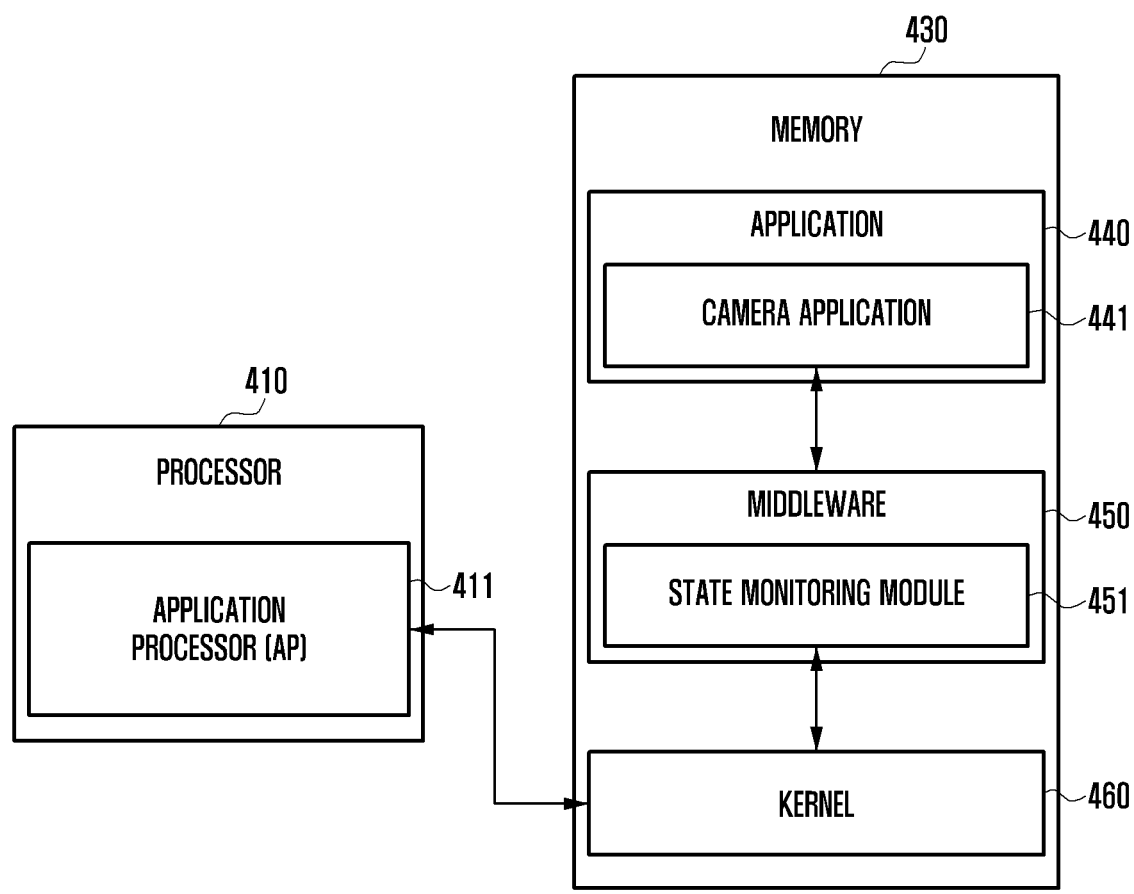
FIG. 4 is a schematic block diagram illustrating a configuration of an electronic device according to various embodiments of the present disclosure.

FIG. 4 is a schematic block diagram illustrating a configuration of an electronic device according to various embodiments of the present disclosure.

The electronic device according to an embodiment of the present disclosure may include a processor 410 and a memory 430.

According to various embodiments, the processor 410 may include at least one of a CPU (Central Processing Unit), AP (Application Processor) 411, CP (Communication Processor), GPU (Graphic Processing Unit), and/or image signal processor. For example, the processor 410 can process calculations or data related to at least one component of the electronic device (e.g., apparatus) 101.

According to an embodiment, the processor 410 may include an application processor 411. The application processor 411 can control a plurality of hardware or software components connected to the processor and perform various data processing and calculations. For example, the application processor 411 can execute, manage, or control an application (for example, camera application 441) stored in the memory 430 through a kernel 460 and middleware 450.

According to an embodiment, the memory 430 may include an application 440, middleware 450, and kernel 460. For example, the memory 430 may include an operating system for controlling resources of the electronic device and/or various applications 440 being driven by the operating system. According to an embodiment, the application 440 may include a camera application 441. The camera application 441 may be an application program for providing an image capture function by using a camera module of the electronic device. According to an embodiment, the camera application 441 may include various operating modes. For example, the camera application 441 may include a continuous shooting mode and a panorama shooting mode. The shooting mode of the camera application 441 is not limited to the above examples and may include various well-known shooting modes. Further, the camera application 441 can provide various settings related to an image capture and play (display). For example, the camera application 441 can provide functions of capturing an image, color and brightness adjustment of a generated or stored image, changing a color sense or a texture, or editing an image. The camera application 441 can provide various functions related to operations of the camera module such as generating and storing an image (for example, still picture or moving picture). According to an embodiment, an execution screen of the camera application 441 may include an area for displaying an external subject being photographed by the camera module, various images for displaying functions and settings provided by the camera application 441, a widget, or a GUI (Graphic User Interface). According to various embodiments of the present disclosure, the camera application 441 may include various applications or programs related to the operations of the camera module.

The middleware 450 can take the role of mediation so that an application can exchange data by communicating with the kernel 460. For example, the middleware 450 can process at least one request for a task received from the application according to a priority ranking. For example, the middleware 450 can assign a priority ranking of using system resources (for example, a bus, processor, or memory 430) to at least one application and process the at least one request for a task.

According to an embodiment, the middleware 450 may include a state monitoring module 451. The state monitoring module (e.g., a daemon) 451 can monitor a state of the electronic device. According to an embodiment, the state monitoring module 451 can monitor an available memory (free memory) of the electronic device. For example, the state monitoring module 451 can monitor the available amount of the system memory 430 of the electronic device. According to an embodiment, the state monitoring module 451 can monitor a temperature, residual battery amount, and communication state of the electronic device (for example, processor). According to an embodiment, the state monitoring module 451 can request or obtain current state information of various resources related to the functions of the electronic device.

For example, the kernel 460 can control or manage system resources (for example, a bus, processor, or memory 430) used for performing an operation or function included in other programs (for example, middleware 450 or applications). The kernel 460 can provide an interface for controlling or managing the system resources by accessing to individual components of the electronic device through the middleware 450 or applications. According to an embodiment, the kernel 460 can communicate with components of the electronic device (for example, hardware components of the electronic device). For example, the kernel 460 can transfer a command to hardware so that the hardware of the electronic device performs an operation utilized for the application or the state monitoring module 451 and transfers information obtained from the hardware to the application or the state monitoring module 451.

Figure 5:
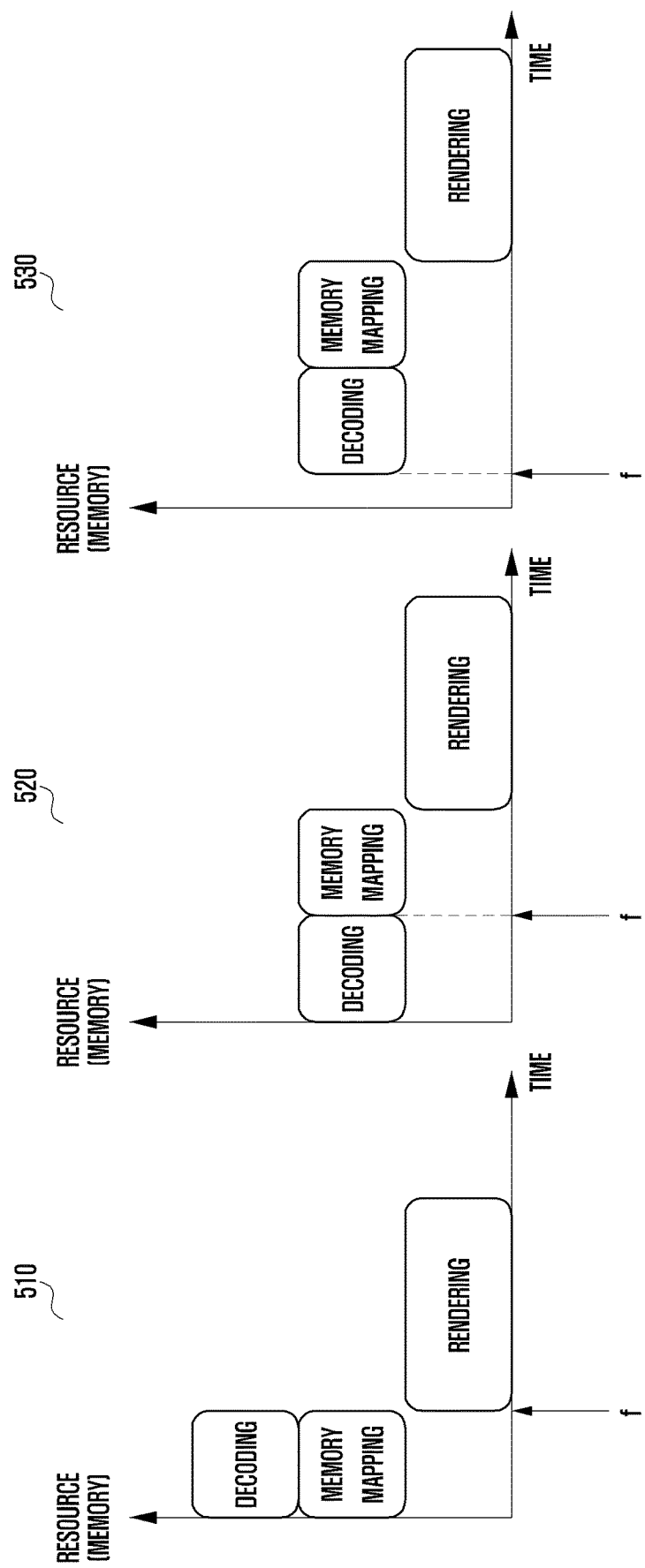
FIG. 5 illustrates an operation of an electronic device according to various embodiments of the present disclosure.

FIG. 5 illustrates an operation of an electronic device according to various embodiments of the present disclosure.

According to an embodiment, the electronic device can monitor a state of the electronic device while activating a camera-related application and control execution of the camera-related application according to the monitoring result.

According to an embodiment, the electronic device can identify an available amount of a system memory while activating a camera-related application. For example, the system memory may be used for storing data or resources related to an application so that the electronic device executes and utilizes the application. For example, the system memory may be a partial area of a memory included in the electronic device. For example, the system memory can be an independent memory or a predetermined partial area of a specific memory.

According to an embodiment, the electronic device can control an execution process of a camera-related application according to an available amount of a system memory. For example, reference number 510 illustrates a case that the available amount of the system memory is greater than or equal to a predetermined second reference value (i.e. if the available amount of the system memory is large), reference number 520 illustrates a case that the available amount of the system memory is less than the second reference value and greater than a first reference value (i.e., if the available amount of the system memory is medium), and reference number 530 illustrates a case that the available amount of the system memory is less than the first reference value (i.e., if the available amount of the system memory is small).

According to an embodiment, the electronic device can proceed with 3 steps of image decoding, memory mapping, and rendering in order to display an execution screen while activating a camera-related application. For example, the electronic device can decode an image related to an execution screen of a camera-related application to a bitmap image. For example, the electronic device can map the decoded image onto a graphic memory. For example, the graphic memory may be a memory for storing an image generated or processed in order to output to a display. The graphic memory may be a separate memory or a predetermined partial area of a specific memory included in the electronic device. For example, the electronic device can map at least one decoded image onto a predetermined area of the graphic memory. For example, the electronic device can render an image to be output to the display based on the image mapped onto the graphic memory. For example, the electronic device can configure an image of an execution screen of a camera-related application to be output to the display based on the mapped image.

According to the case illustrated by reference number 510, if the available amount of the system memory is larger than or equal to the second reference value while activating a camera-related application, the electronic device can decode an image related to an execution screen before detecting a user input f and map the decoded image onto a graphic memory. The user input "f" is used to control the camera-related application and may include an input for executing a specific function of the camera-related application, an input for switching the execution screens, an input for changing settings, or input for displaying an image, icon, widget, or GUI provided by the camera-related application.

According to an embodiment, if the available amount of the system memory is large, the electronic device can respond to a detection of a user input f promptly by performing image decoding and memory mapping in advance. For example, if the available amount of the system memory is large, the electronic device can decode at least one image related to an execution screen of a camera-related application (such as, for example, an execution screen, image, icon, widget, and GUI which can be additionally displayed in a current execution screen of the camera-related application according to the user input f) before detecting the user input f. Further, the electronic device can map the decoded image onto a graphic memory before detecting the user input f. For example, if the user input f is detected, the electronic device can display an image corresponding to the user input f promptly by rendering the decoded and mapped image. According to various embodiments, if the memory situation of the electronic device meets the requisite threshold, the electronic device can improve response speed to the user input f by pre-performing (e.g., performing in advance) operations excluding the rendering.

According to the case illustrated by reference number 520, if the available amount of the system memory is less than the second reference value and greater than or equal to the first reference value while activating a camera-related application, the electronic device can decode an image related to an execution screen before detecting the user input f According to an embodiment, if the user input f is detected, the electronic device can map the decoded image onto the graphic memory in response to the user input f and render an image to be displayed based on the mapped image. According to various embodiments, if the memory situation of the electronic device is medium, the electronic device can reduce the load of the system memory and provide a relatively high response speed by performing some tasks in advance.

According to the case illustrated by reference number 530, if the available amount of the system memory is less than the first reference value while activating the camera-related application, the electronic device can maintain a currently displaying screen without a separate operation before detecting the user input f According to an embodiment, if the user input f is detected, the electronic device can decode an image related to an execution screen of the camera-related application in response to the user input f, map the decoded image onto a graphic memory, and render an image to be displayed based on the mapped image. For example, if the available amount of the system memory is identified to be insufficient, the electronic device can reduce an unnecessary use of memory by not performing an advanced task before detecting the user input f. For example, the electronic device can allocate the system memory for the operation of displaying the currently displaying screen, and allocate the system memory related to an operation of displaying a screen to be switched over if a user input f for switching the screen is detected. According to various embodiments, the electronic device can use the memory efficiently by using or allocating the memory according to the available amount of the system memory so that general operations of the electronic device are performed seamlessly.

Figure 6:
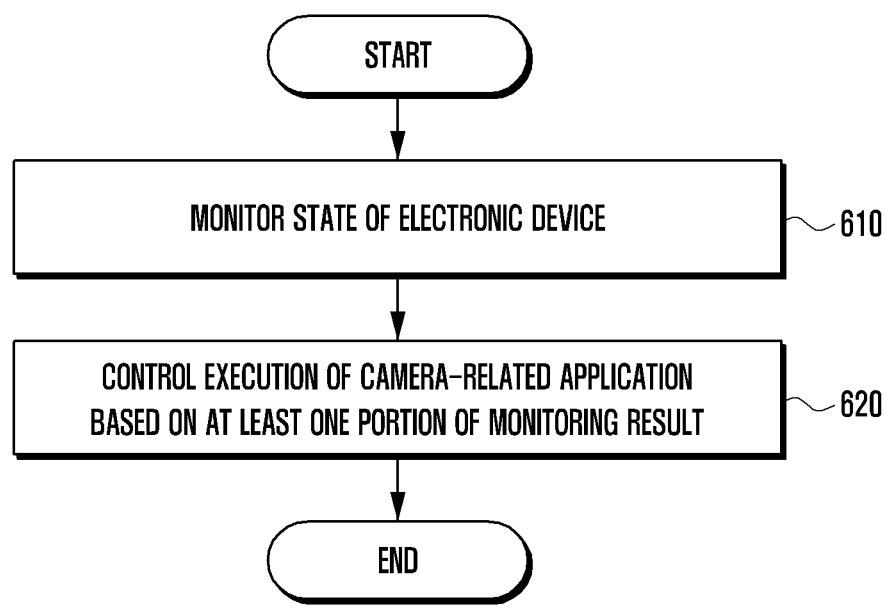
FIG. 6 is a flowchart illustrating a method for controlling an operation in an electronic device according to various embodiments of the present disclosure.

FIG. 6 is a flowchart illustrating a method for controlling an operation in an electronic device according to various embodiments of the present disclosure.

The electronic device monitors a state of the electronic device at operation 610. For example, the electronic device can monitor an available amount of a system memory. According to an embodiment, the electronic device can monitor a temperature, residual battery amount, and communication state of the electronic device (for example, processor). According to an embodiment, the electronic device can monitor various resources utilized for executing a camera-related application. According to various embodiments, the electronic device can monitor the state of the electronic device all the time, when a user input for activating a camera-related application is received, or when the camera-related application is activated. According to various embodiments, the electronic device can monitor an external environment including an external or environmental illuminance.

The electronic device controls an execution of a camera-related application based on at least one portion of the monitoring result at operation 620. According to an embodiment, the electronic device can monitor an available amount of a system memory and control a camera-related application according to the available amount of the system memory. For example, the electronic device can control a process of displaying an execution screen of the camera-related application according to the available amount of the system memory. For example, if the available amount of the system memory is greater than or equal to a reference value, the electronic device can perform a partial process (for example, an image decoding process or a graphic memory mapping process) and perform an image rendering process according to a user input. If the available amount of the system memory is less than the reference value, the electronic device can perform a process related to switching a screen of the camera-related application sequentially after detecting a user input.

According to an embodiment, the electronic device can control a process of activating a camera-related application according to the available amount of the system memory. For example, the electronic device can generate a plurality of threads utilized for activating the camera-related application and process the plurality of threads in parallel or in sequence according to the available amount of the system memory.

According to an embodiment, the electronic device can adjust setting values of the camera-related application (for example, a frame rate, continuous shooting speed, number of frames of continuous shooting, and resolution) according to the monitored state of the electronic device (for example, a temperature of the electronic device and a clock speed of a processor) or an environmental illuminance. The electronic device can determine the number of preview buffers allocated to a memory in order to execute the camera-related application according to the monitored state of the electronic device or environmental illuminance.

Figure 7:
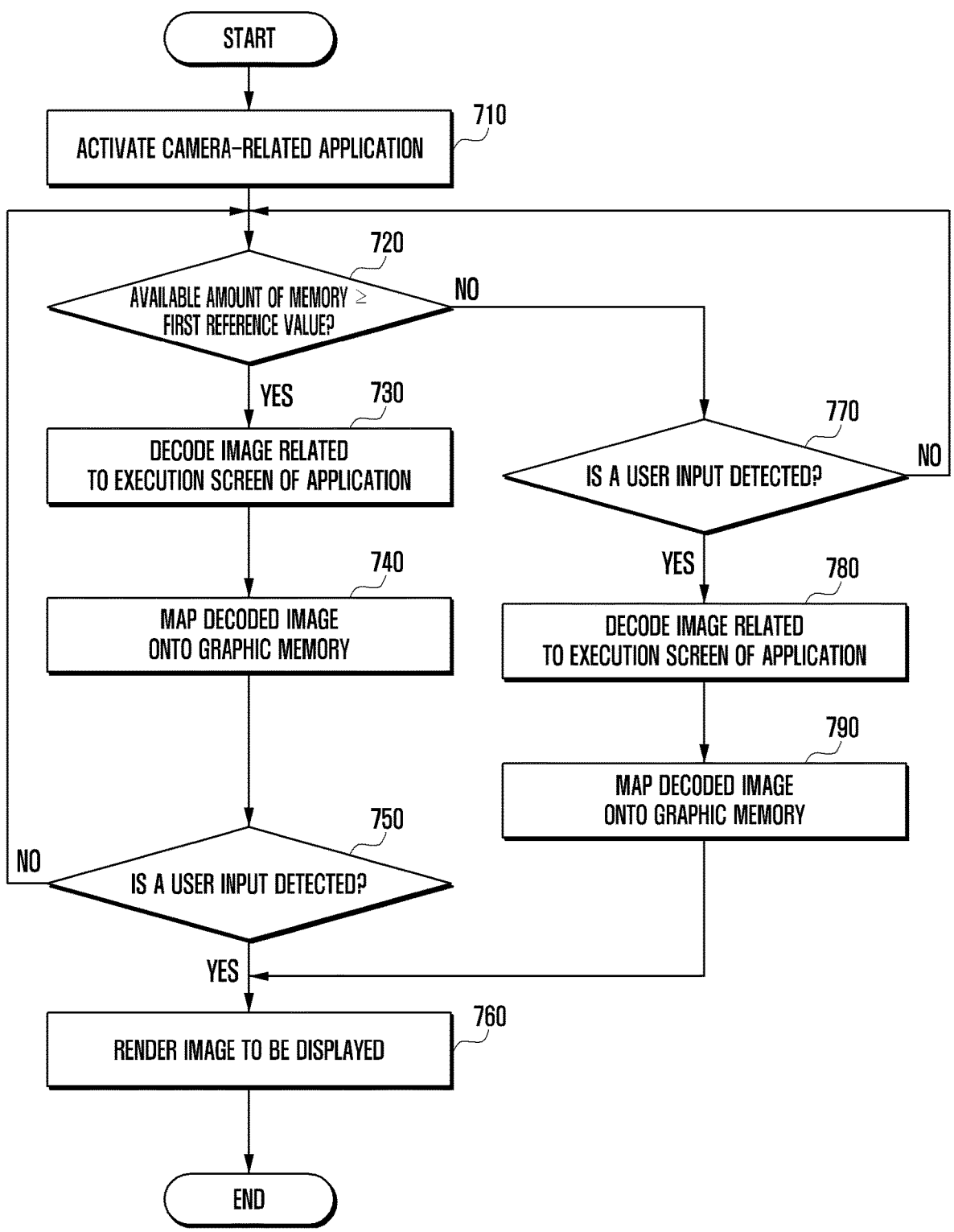
FIG. 7 is a flowchart illustrating a method for controlling an operation in an electronic device according to various embodiments of the present disclosure.

FIG. 7 is a flowchart illustrating a method for controlling an operation in an electronic device according to various embodiments of the present disclosure.

The electronic device activates a camera-related application at operation 710. For example, the electronic device can receive a user input for activating a camera-related application. The electronic device can activate (e.g., execute) the camera-related application in response to the user input.

The electronic device at operation 720 identifies an available amount of a system memory while activating the camera-related application. For example, the system memory may be a memory for storing data or resources related to an application for facilitating execution and utilization of the application. For example, the system memory may be an independent memory, or a predetermined partial area or specific partition within the memory.

According to various embodiments, the electronic device can continuously monitor a state of the electronic device (for example, an available amount of a system memory) in a "turned-on" or activated state. According to an embodiment, the electronic device can identify whether the available amount of the system memory is greater than or equal to a predetermined first reference value. If the available amount of the system memory is greater than or equal to the first reference value, the electronic device performs operation 730, and if the available amount of the system memory is less than the first reference value, the electronic device performs operation 770.

If the available amount of the system memory is greater than or equal to the first reference value, the electronic device decodes an image related to an execution screen of an application at operation 730. For example, the electronic device can decode an image related to an execution screen of a camera-related application to a bitmap image before detecting a user input.

For example, the electronic device can decode at least one image related to the execution screen of the camera-related application (such as, for example, an image, icon, widget, and GUI which can be displayed additionally in the execution screen of the camera-related application) before detecting a user input.

The electronic device maps the decoded image onto a graphic memory at operation 740. For example, the electronic device can store at least one decoded image temporarily by mapping the decoded image onto a predetermined area of the graphic memory.

The electronic device may determine whether a user input is detected at operation 750. For example, the user input may be an input for controlling the camera-related application (such as, for example, an input for executing a specific function of the camera-related application). For example, the user input may include an input for switching to an execution screen, input for changing settings, or input for displaying an image, icon, widget, or GUI provided by a camera-related application. According to an embodiment, if the user input is not detected, the electronic device continues returns to operation 720 to monitor the available amount of the system memory. If the user input is detected, the electronic device performs operation 760.

The electronic device at operation 760 renders an image to be displayed in response to the user input. For example, the electronic device can render the image to be displayed based on the image mapped onto the graphic memory and the user input. For example, the electronic device can change an execution screen of a camera-related application by outputting the rendered image to a display. For example, the electronic device can output an execution screen to the display corresponding to the user input.

If the available amount of the system memory is less than the first reference value, the electronic device may determine whether a user input is detected at operation 770. For example, the electronic device can maintain a currently displaying execution screen of the camera-related application until the user input is detected. If the user input is not detected, the electronic device continues at operation 720 to monitor the available amount of the system memory. If the user input is detected, the electronic device performs operation 780.

The electronic device decodes an image related to the execution screen of the camera-related application at operation 780. For example, the electronic device can decode an image related to the execution screen of the camera-related application in response to the user input. For example, the electronic device can decode or change an image related to an execution screen of an application to be displayed according to the user input. For example, when switching from an execution screen displayed according to a user input to another execution screen (such as, for example, an execution screen of which at least one part is changed from or added to a currently displaying execution screen), the electronic device can decode an image to be displayed newly in the execution screen.

The electronic device maps the decoded image onto a graphic memory at operation 790. For example, the electronic device can allocate a predetermined area of the graphic memory for the decoded image. According to an embodiment, after mapping the decoded image onto the graphic memory, the electronic device can render an image to be displayed based on the mapped image at operation 760.

According to various embodiments of the present disclosure, the electronic device can control operations of displaying, changing, or switching a screen of a camera-related application according to an available amount of a system memory. For example, if the available amount of the system memory is sufficiently large, the electronic device can increase a response speed to a user input by performing various tasks related to an execution screen before detecting a user input. If the available amount of the system memory is not sufficiently large, the electronic device can avoid an unnecessary memory use or allocation and improve the efficiency of memory use by performing the important tasks sequentially.

Figure 8:
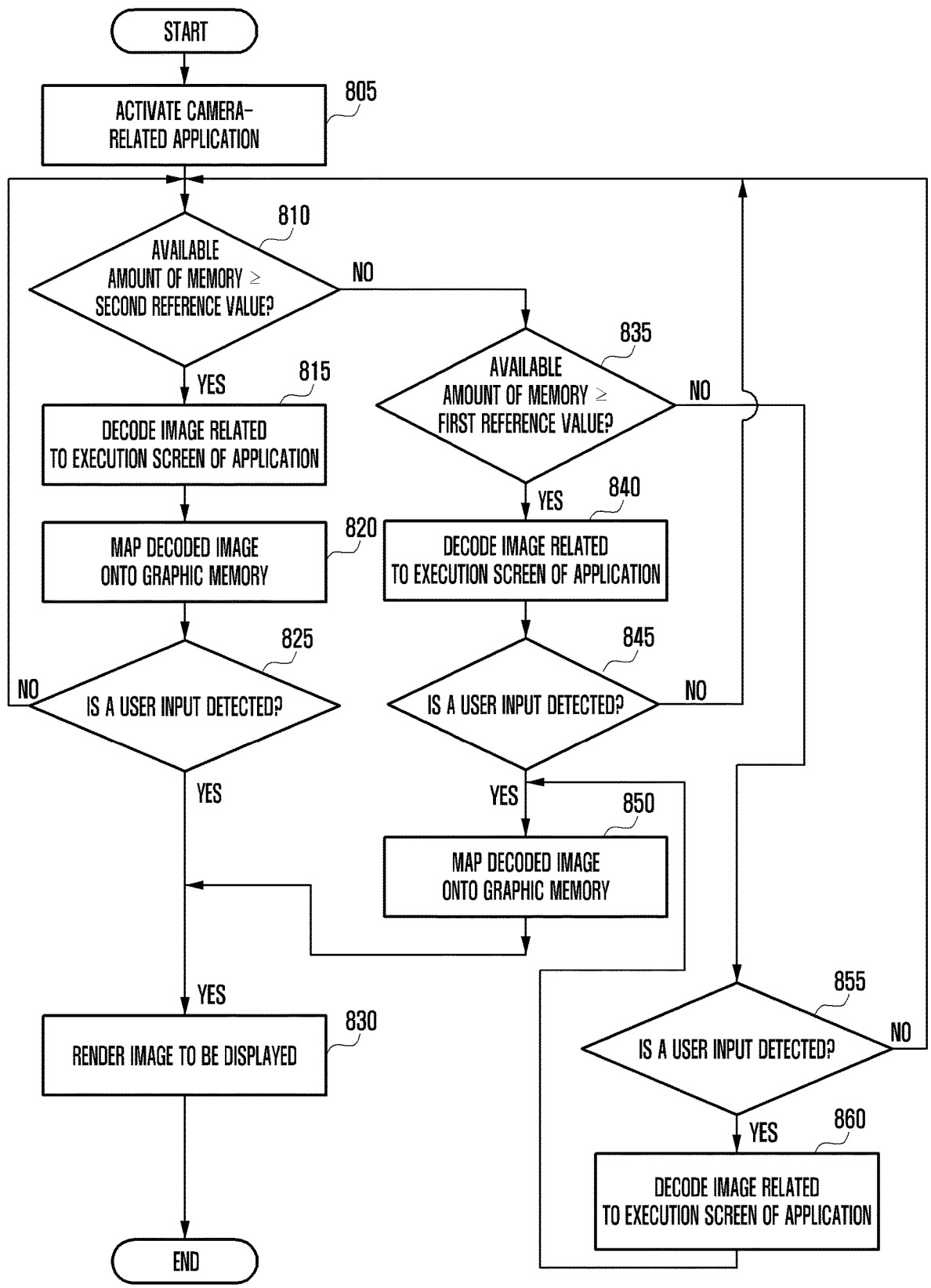
FIG. 8 is a flowchart illustrating a method for controlling an operation in an electronic device according to various embodiments of the present disclosure.

FIG. 8 is a flowchart illustrating a method for controlling an operation in an electronic device according to various embodiments of the present disclosure. Hereinafter, operations similar to those of FIG. 7 are briefly described.

The electronic device activates a camera-related application at operation 805. The electronic device can activate (e.g., execute) the camera-related application responding to a user input.

The electronic device at operation 810 identifies an available amount of a system memory while activating the camera-related application. The electronic device can identify whether the available amount of the system memory is greater than or equal to a predetermined second reference value. If the available amount of the system memory is greater than or equal to a predetermined second reference value, the electronic device performs operation 815, and if the available amount of the system memory is less than the second reference value, the electronic device performs operation 835.

If the available amount of the system memory is greater than or equal to the second reference value, the electronic device decodes an image related to an execution screen of an application at operation 815. For example, the electronic device can decode an image related to an execution screen of a camera-related application to a bitmap image before detecting a user input. For example, the electronic device can decode at least one image related to the execution screen of the camera-related application (such as, for example, an execution screen, image, icon, widget, and GUI which can be additionally displayed in the current execution screen of the camera-related application according to the user input) before detecting a user input.

The electronic device at operation 820 maps the decoded image onto a graphic memory before detecting a user input. For example, the electronic device can store at least one decoded image temporarily by mapping onto a predetermined area of the graphic memory.

The electronic device may determine whether a user input is detected at operation 825. For example, the user input may be an input for controlling a camera-related application. According to an embodiment, if the user input is not detected, the electronic device continues at operation 810 to monitor the available amount of the system memory. If the user input is detected, the electronic device performs operation 830.

The electronic device at operation 830 renders an image to be displayed in response to the user input. For example, the electronic device can render the image to be displayed based on the image mapped onto the graphic memory and the user input.

The electronic device at operation 835 identifies whether the available amount of the system memory is greater than or equal to a predetermined first reference value. If the available amount of the system memory is greater than or equal to the first reference value, the electronic device performs operation 840, and if the available amount of the system memory is less than the first reference value, the electronic device performs operation 855.

The electronic device decodes an image related to an execution screen of an application at operation 840. For example, the electronic device can decode an image related to an execution screen of a camera-related application to a bitmap before detecting a user input.

The electronic device may determine whether a user input is detected at operation 845. According to an embodiment, if the user input is not detected, the electronic device continues at operation 810 to monitor the available amount of the system memory. If the user input is detected, the electronic device performs operation 850.

The electronic device maps the decoded image onto a graphic memory in response to the user input. For example, the electronic device can store at least one decoded image temporarily by mapping onto a predetermined area of the graphic memory in response to the user input. According to an embodiment, after mapping the image onto the graphic memory, the electronic device renders an image to be displayed at operation 830.

The electronic device may determine whether a user input is detected at operation 855. According to an embodiment, if the available amount of the system memory is less than the first reference value, the electronic device can maintain a currently displayed execution screen of the camera-related application without performing a separate operation. For example, the electronic device can use or allocate a system memory as much as utilized for maintaining the currently displaying execution screen of the camera-related application. According to an embodiment, if the user input is not detected, the electronic device continues at operation 810 to monitor the available amount of the system memory. If the user input is detected, the electronic device performs operation 860.

The electronic device at operation 860 decodes an image related to an execution screen of an application in response to the user input. For example, the electronic device can decode the image related to an execution screen of a camera-related application to a bitmap image in response to the user input. For example, the electronic device can decode an image related to an execution screen of an application to be displayed or changed according to a user input. For example, when switching from the currently displaying execution screen to another execution screen (such as, for example, an execution screen of which at least one part is changed from or added to a currently displaying execution screen) according to the user input, the electronic device can decode an image to be displayed newly related to the execution screen. According to an embodiment, the electronic device at operation 850 maps the decoded image onto a graphic memory after decoding the image. The electronic device at operation 830 renders an image to be displayed based on the image mapped onto the graphic memory.

According to various embodiments of the present disclosure, the electronic device can control operations of displaying, changing, or switching a screen according to an available amount of a system memory. For example, if the available amount of the system memory is large enough, the electronic device can increase a response speed to a user input by performing various tasks (such as, for example, image decoding and memory mapping) related to an execution screen before detecting a user input. If the available amount of the system memory is medium, the electronic device can reduce an unnecessary memory use by performing partial tasks (such as, for example, image decoding) in advance of detecting a user input and thereby provide a good response speed to the user input. If the available amount of the system memory is small, the electronic device can avoid an unnecessary memory use or allocation and improve the efficiency of memory use by performing important tasks sequentially in response to the user input.

Figure 9:
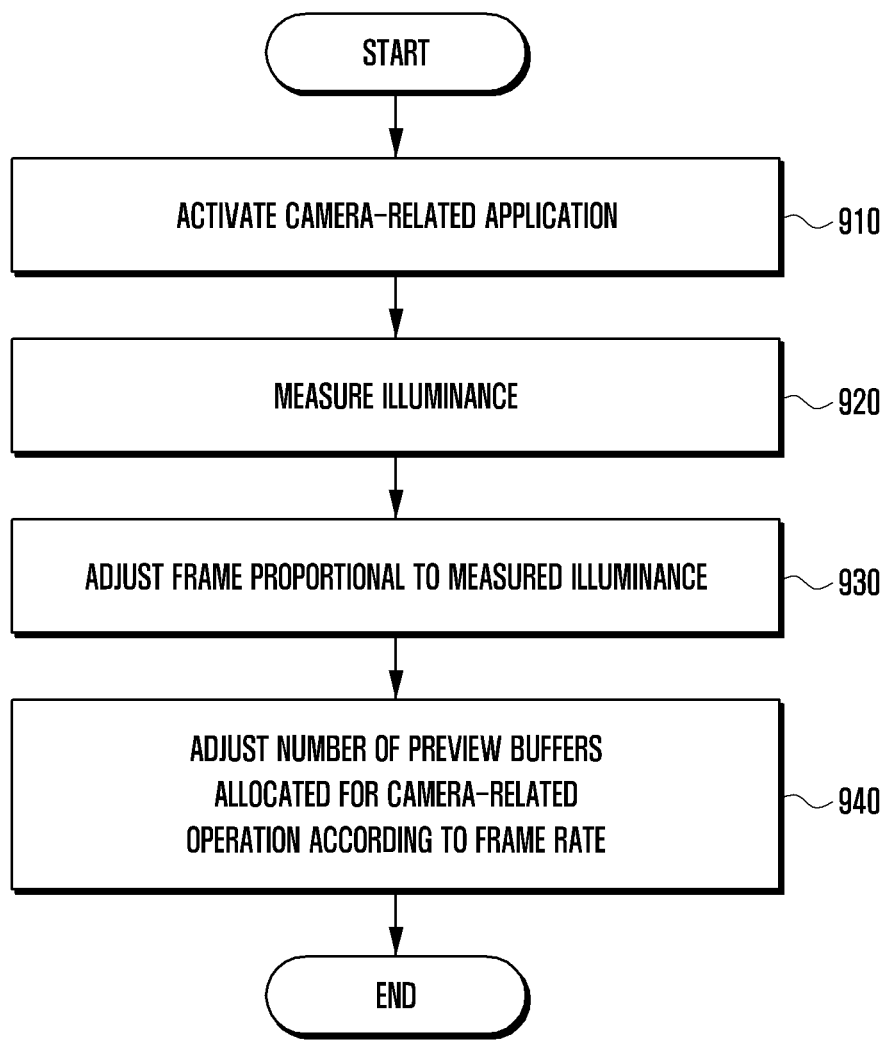
FIG. 9 is a flowchart illustrating a method for controlling an operation in an electronic device according to various embodiments of the present disclosure.

FIG. 9 is a flowchart illustrating a method for controlling an operation in an electronic device according to various embodiments of the present disclosure.

The electronic device activates a camera-related application at operation 910. For example, the electronic device can activate (e.g., execute) the camera-related application in response to a user input.

The electronic device measures an environmental illuminance of the surroundings of the electronic device at operation 920 using an appropriate sensor (e.g., illuminance sensor 240K from FIG. 2).

The electronic device adjusts a frame rate of the camera-related application in proportion to the measured illuminance at operation 930. According to an embodiment, the electronic device can control a camera module through the camera-related application. The electronic device can provide an Auto Exposure (AE) function according to the measured illuminance while capturing an image by using the camera module. The electronic device can set a frame rate of an image provided by the camera-related application differently according to the measured illuminance. For example, if the surrounding illuminance is low and the frame rate is high, the quality and illuminance of an image captured by the electronic device may be reduced. The electronic device can decrease a preset frame rate to a lower value for a detected illuminance below a predetermined illuminance threshold, and increase the frame rate to a higher value for a detected illuminance higher than a predetermined illuminance threshold.

The electronic device at operation 940 adjusts the number of preview buffers allocated for a camera-related operation according to the frame rate. For example, the electronic device can adjust the number of preview buffers allocated for a camera-related function or operation (such as, for example, execution or control of a camera-related application and control of a camera module) according to the frame rate. The preview buffer may be a memory for storing information utilized for a camera-related operation, data, or image. For example, the preview buffer can temporarily store an image captured and generated by a camera module of the electronic device. According to various embodiments, the preview buffer may be an independent memory or a predetermined partial area of a memory included in the electronic device.

For example, the size of memory space utilized for a camera-related application decreases because the amount of processing images decreases if the frame rate is low. The electronic device can adjust the size or the number of preview buffers allocated for an operation of a camera-related application in a memory according to a frame rate change. For example, the electronic device can decrease the size of memory area allocated for an operation of a camera-related application or the number of preview buffers allocated for image processing as the frame rate becomes lower.

Figure 10:
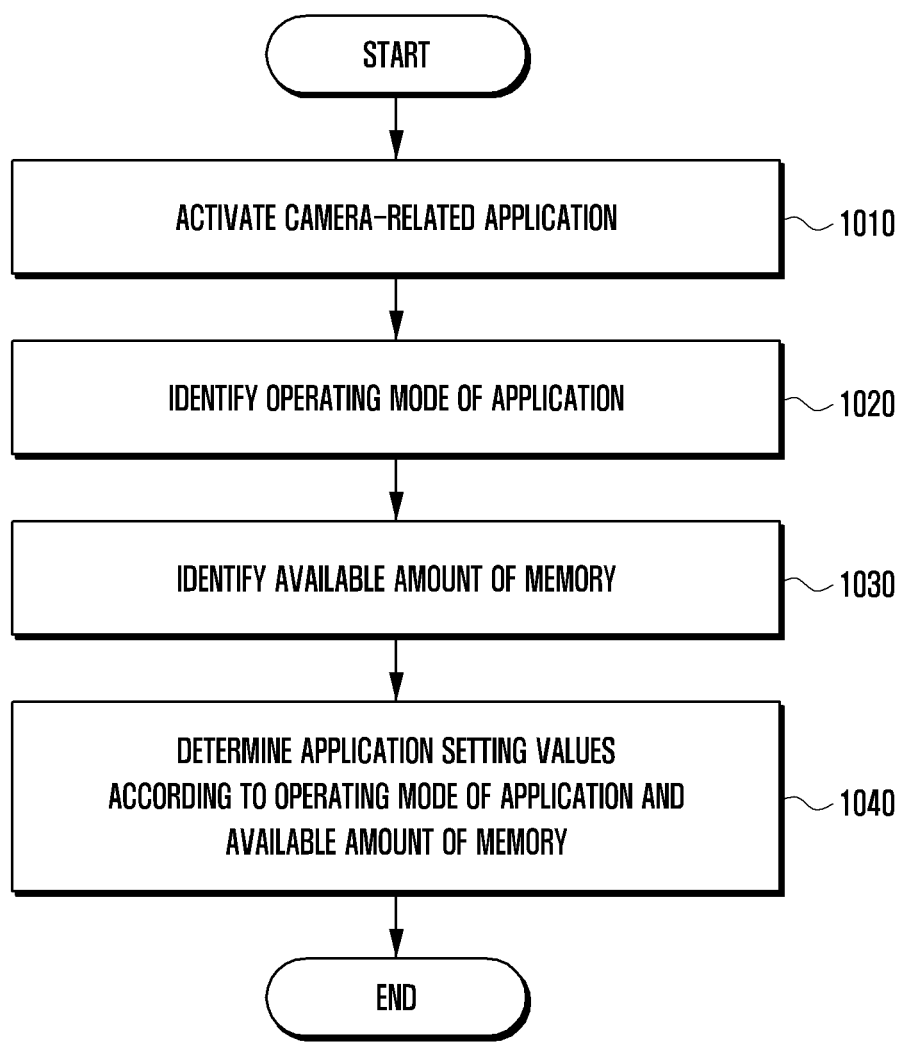
FIG. 10 is a flowchart illustrating a method for controlling an operation in an electronic device according to various embodiments of the present disclosure.

FIG. 10 is a flowchart illustrating a method for controlling an operation in an electronic device according to various embodiments of the present disclosure.

The electronic device activates a camera-related application at operation 1010. For example, the electronic device can activate (e.g., execute) the camera-related application in response to a user input.

The electronic device identifies an operating mode of a camera-related application at 1020. For example, the camera-related application may include various operating modes. For example, the camera-related application may include a continuous shooting mode and a panorama shooting mode. For example, the electronic device can identify whether the activated camera-related application is currently in a continuous shooting mode or a panorama shooting mode.

The electronic device identifies an available amount of a system memory at operation 1030. For example, the electronic device can identify a memory or system memory of the electronic device. For example, the system memory may be a separate storage space or a predetermined partial area or partition of a memory included in the electronic device. The system memory can temporarily store resources utilized for various functions and operations of the electronic device (such as, for example, execution of a camera-related application). The electronic device can identify an available amount of a memory or a system memory currently usable for the camera-related application. For example, the electronic device can identify a memory amount for storing data or images related to the operations and functions of the camera-related application.

The electronic device at operation 1040 determines setting values of an application according to an operating mode of an application and an available amount of a memory. For example, if the camera-related application is in a continuous shooting mode, the electronic device can adjust the number of frames or speed of continuous shooting according to the available amount of the memory or system memory. For example, the electronic device can set the number of frames or speed of continuous shooting to a higher value as the available amount of the memory or system memory increases. For example, if the continuous shooting is performed at a high speed or with a great number of frames in case that the available amount of the memory or system memory is small, the operation of the electronic device (such as, for example, execution of a camera-related application) cannot be performed smoothly, or can be delayed or suspended. If the available amount of the memory or system memory is small, the electronic device can operate seamlessly by setting the number of frames or speed of the continuous shooting to a lower value. As another example, the electronic device can deactivate a picking function of selecting and storing a specific image from captured images in the continuous shooting mode.

For example, if the camera-related application is in a panorama shooting mode, the electronic device can adjust a resolution according to the available amount of the memory or system memory. For example, the electronic device can adjust resolutions of individual images to generate a panorama image. For example, the electronic device can reduce the resolution as the available amount of the memory or system memory decreases. For example, the electronic device can reduce a queue capacity of a panorama image by reducing the resolution of the captured (e.g., generated) image. As another further example, the electronic device can terminate the panorama shooting mode if the available amount of the memory or system memory is less than a predetermined value.

According to various embodiments, the electronic device can measure an external illuminance of the electronic device by using at least one sensor. The electronic device can determine setting values of an application according to the operating mode of the application and the measured illuminance. For example, if the application is in a continuous shooting mode, the electronic device can determine a continuous shooting speed or the number of frames of continuous shooting according to the measured illuminance. For example, if the illuminance is low, a clear image cannot be obtained or unnecessary images that cannot be identified by a user may be generated while photographing a subject. According to various embodiments, if the illuminance is low, the electronic device can readjust the continuous shooting speed or the number of frames of continuous shootings to a value lower than a reference value. Alternatively, if the application is in a panorama shooting mode, the electronic device can set a resolution of an image to be captured (e.g., generated) to a value lower than the reference value or terminate the panorama shooting mode.

According to various embodiments of the present disclosure, the electronic device can reduce generation of unnecessary images and consumption of resources (such as, for example, memory or system memory) for an effective use of the resources by changing the setting values of the application based on at least one of the available amount of the memory or system memory and an external environment of the electronic device while activating the camera-related application.

Figure 11:
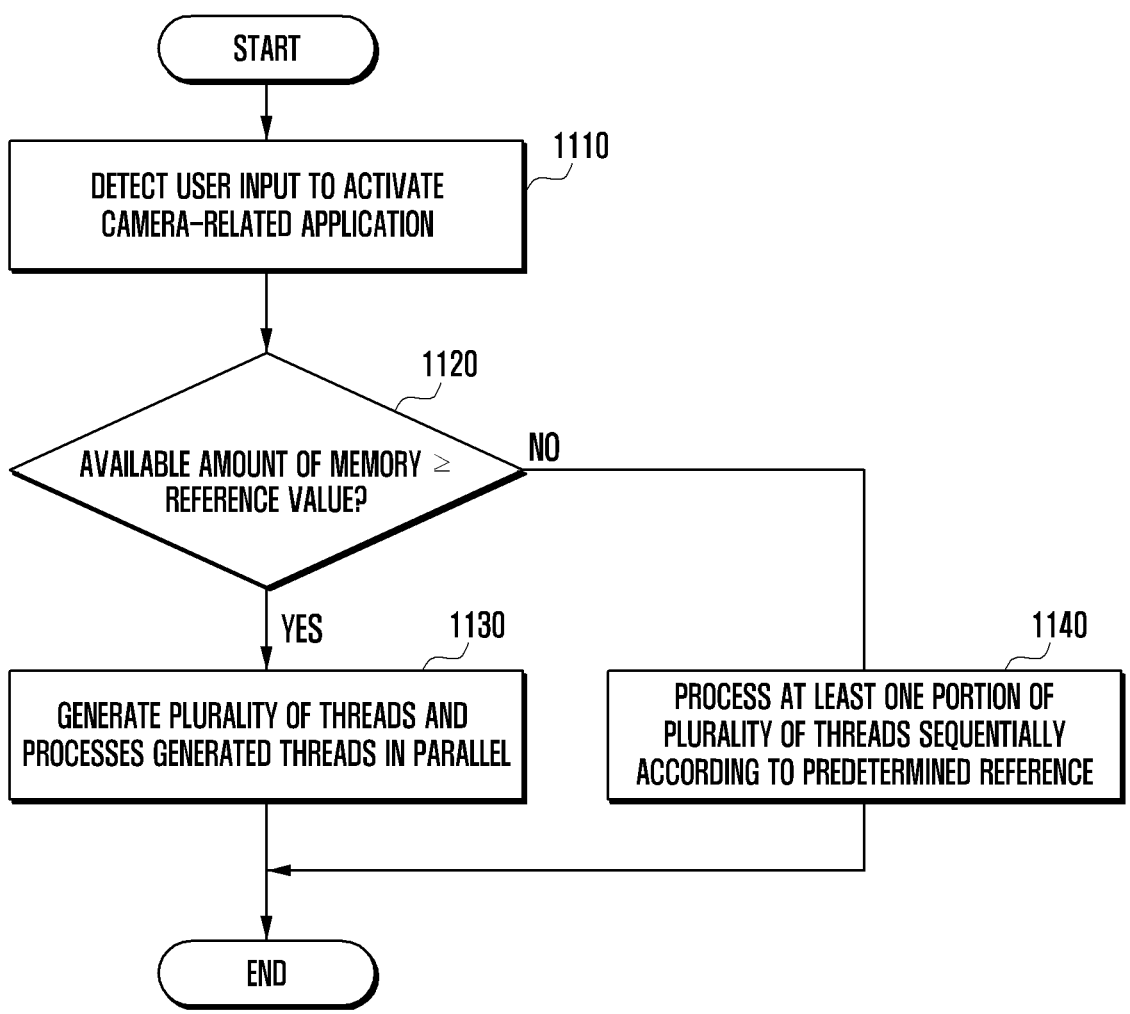
FIG. 11 is a flowchart illustrating a method for controlling an operation in an electronic device according to various embodiments of the present disclosure.

FIG. 11 is a flowchart illustrating a method for controlling an operation in an electronic device according to various embodiments of the present disclosure.

The electronic device detects a user input for activating a camera-related application at operation 1110. For example, the electronic device can receive a touch input for executing the camera-related application.

The electronic device identifies whether an available amount of a memory is greater than a reference value. For example, the electronic device can identify an available amount of a system memory. For example, the system memory may be a separate memory or a predetermined area of a memory installed in the electronic device. The system memory can store resources utilized for various functions and operations of the electronic device (such as, for example, execution of a camera-related application). The electronic device can identify the available amount of the system memory that can be used for activation of the camera-related application. If the available amount of the system memory is greater than or equal to a reference value in operation 1120, the electronic device performs operation 1130, and if the available amount of the system memory is less than the reference value, the electronic device performs operation 1140. According to various embodiments, the reference value can be predetermined or set or changed according to a user input.

The electronic device generates a plurality of threads at operation 1130. For example, the electronic device can generate a plurality of threads utilized for activating a camera-related application. For example, the plurality of threads utilized for the camera-related application may include a main thread, background handler thread, state message handler thread, camera holder preparation thread, open camera thread, start preview thread, base menu loading thread, camera sound loading thread, orientation information thread, and heavy resource loading thread.

For example, the main thread may be a thread for operating a camera of the electronic device with a basic life cycle. The background handler thread may be a thread for performing functions blocked for securing the performance of the main thread. For example, the background handler thread may include a thread for controlling such that a thumbnail updater generates a thumbnail and processes the thumbnail after generating a media database. For example, the background handler thread may include a thread for increasing or decreasing an operating speed or an electric current consumption of a processor by controlling an operating clock of the processor. The state message handler thread may be a thread for referring, storing, or managing a state of a camera (such as, for example, camera-related application or camera module). The camera holder preparation thread may be a thread for managing information of a camera module and controlling to switch on or off the camera module. For example, the camera holder preparation thread may include an abstract thread for executing a camera function (such as, for example, camera-related application) immediately from a switched-on (e.g., activated) or standby state of the camera module. The open camera thread may be a thread for initializing the camera module by supplying a power to a camera module. The start preview thread may be a thread for controlling transmission of a camera stream through a camera module. The base menu loading thread may be a thread for decoding resources of a basic execution screen of a camera-related application, allocating a memory, and performing a mapping task. The camera sound loading thread may be a thread for loading a sound related to a camera function such as a camera's shutter sound. The orientation information thread may be a thread for managing information to improve an ISP (Image Signal Processing) performance by identifying orientation of an electronic device. The heavy resource loading thread may be a thread for loading resources utilized to be set excluding a key screen of a camera-related application. The treads generated by the electronic device are not limited to the above examples and may further include various other threads for controlling operations of the electronic device.

According to an embodiment, if the available amount of the system memory is greater than or equal to the reference value, the electronic device can process a plurality of threads in parallel. For example, the electronic device can perform multi-threading of the plurality of generated threads. For example, if the available amount of the system memory is identified to be large enough, the electronic device can allocate the system memory separately for the plurality of generated threads and process the plurality of threads in parallel. For example, the electronic device can prevent a race condition between threads by multi-threading the plurality of threads so that an idling period of a processor is not generated.

The electronic device processes at least one part of the plurality of generated threads at operation 1140. For example, the electronic device can allocate a memory area as much as utilized for processing the threads sequentially without locating the memory area for all the threads.

According to an embodiment, the electronic device can select at least one part of the plurality of threads according to a predetermined reference. For example, the predetermined reference may be a condition for selecting a minimum number of threads utilized for executing (entering) a camera-related application. For example, the electronic device can process threads that are an essential requirement for entering the camera-related application (for example, a thread to be processed preferentially to display an initial execution screen of the camera-related application) or partially selected threads, and process the remaining threads sequentially.

For example, the predetermined reference may be a condition for selecting threads according to a memory amount utilized for executing each of the plurality of threads. For example, the electronic device can process a thread requiring a small memory amount first and process a thread requiring a large memory amount (for example, sound loading thread or heavy resource loading thread) in memory loading (or memory allocating) at the last step of entering the camera-related application.

According to an embodiment, the electronic device can process some threads from the plurality of threads in parallel and the remaining threads in sequence. For example, the electronic device can process threads having a correlation among the plurality of threads (for example, threads utilized to be processed in order) in sequence and process threads having no correlation in parallel.

According to various embodiments of the present disclosure, the electronic device enables an effective use of resources by controlling a plurality of thread processing methods (for example, parallel processing or "multi-threading" or sequential processing) according to an available amount of a system memory at a time of executing a camera-related application (i.e., time of entering the camera-related application).

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations which have been known or are to be developed in the future.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:
1. An electronic device comprising:
   a display;
   a camera module;
   a processor electrically coupled to the display and the camera module;
   a first memory storing data relating to applications installed in the electronic device; and
   a second memory storing an image generated for displaying on the display,
   wherein the first memory stores program instructions that, when executed, cause the processor to:
      identify, in response to execution of a camera-related application, an available amount of the first memory, and
      compare the available amount of the first memory to a predetermined first reference value, whether to determine when to decode an image related to an execution screen of the camera-related application, and map the decoded image onto the second memory relative to a user input,
   wherein when the available amount is greater than predetermined first reference value, the image is decoded prior to receiving a user input, and when the available amount is less than the predetermined first reference value, the image is decoded after receiving the user input.

2. The electronic device of claim 1, wherein the program instructions are further executed by processor to:
   in response to the available amount of the first memory is greater than or equal to the predetermined first reference value, before detecting the user input for controlling the camera-related application, decode an image related to an execution screen of the camera-related application, map the decoded image onto the second memory, and render an image to be output to the display based on the image mapped onto the second memory for display upon detection of the user input; and
   in response to the available amount of the first memory is less than the predetermined first reference value, in response to detecting the user input, decode the image related to an execution screen of the camera-related application, map the decoded image onto the second memory, and render an image to be output to the display based on the image mapped onto the second memory.

3. The electronic device of claim 2, wherein the program instructions are executed by the processor to:
   in response to the available amount of the first memory is less than a predetermined second reference value and greater than or equal to the predetermined first reference value, before detecting the user input, decode the image related to the execution screen of the camera-related application, map the decoded image onto the second memory if the user input is detected, and render an image to be output to the display based on the image mapped onto the second memory.

4. The electronic device of claim 1, further comprising: at least one sensor, the program instructions further executed by the processor to:
   measure an environmental illuminance via the at least one sensor and adjusting a frame rate of the camera module in the camera-related application in proportion to the measured environmental illuminance.

5. The electronic device of claim 4, wherein the program instructions are further executed by the processor to adjust a number of buffers allocated in the first memory for a camera-related operation of the electronic device according to the adjusted frame rate.

6. The electronic device of claim 2, wherein the program instructions are further executed by the processor to:

identify an operating mode of the camera-related application; and if the identified operating mode is a continuous shooting mode, set at least one of a continuous shooting speed and a number frames to execute continuous shooting according to an environmental illuminance as measured by a sensor according to at least one of the available amount of the first memory, or a sensor.

7. The electronic device of claim 6, wherein the program instructions are further executed by the processor to:

if the identified operating mode is a panorama shooting mode, adjust a resolution of an image captured according at least one of the available amount of the first memory and the environmental illuminance as detected by a sensor.

8. The electronic device of claim 1, wherein the program instructions are further executed by the processor to:

in response to detecting a user input activating the camera-related application, identify the available amount of the first memory, generate a plurality of threads when the camera-related application is activated and process the plurality of threads in parallel if the available amount of the first memory is greater than or equal to a predetermined third reference value, and process at least one portion of the plurality of threads sequentially according to a predetermined processing reference value if the available amount of the first memory is less than the predetermined third reference value.

9. The electronic device of claim 8, wherein the program instructions are further executed by the processor to determine an order of execution for the plurality of threads according to a memory amount utilized for processing each of the plurality of threads.

10. A method in an electronic device, comprising:

identifying, in response to execution of a camera-related application, an available amount of a first memory storing data relating to applications installed in the electronic device; and comparing the available amount of the first memory to a predetermined first reference value to determine when to decode an image related to an execution screen of the camera-related application and map the decoded image onto a second memory storing an image generated for displaying on a display, relative to a user input, wherein when the available amount is greater than predetermined first reference value, the image is decoded prior to receiving a user input, and when the available amount is less than the predetermined first reference value, the image is decoded after receiving the user input.

11. The method of claim 10, wherein the operation of determining comprises:

in response to the available amount of the first memory is greater than or equal to the predetermined first reference value, before detecting a user input for controlling the camera-related application, decoding an image related to an execution screen of the camera-related application, mapping the decoded image onto the second memory, and rendering an image to be output to the display based on the image mapped onto the second memory for display upon detection of the user input; and in response to the available amount of the first memory is less than the predetermined first reference value, in response to detecting the user input, decoding the image related to the execution screen of the camera-related application, mapping the decoded image onto the second memory, and rendering the image to be output to the display based on the image mapped onto the second memory.

12. The method of claim 11, further comprising:

in response to the available amount of the first memory is less than a predetermined second reference value and greater than or equal to the predetermined first reference value, before detecting the user input, decoding an image related to the execution screen of the camera-related application, mapping the decoded image onto the second memory if the user input is detected, and rendering an image to be output to the display based on the image mapped onto the second memory.

13. The method of claim 10, further comprising:

measuring an environmental illuminance via a sensor of the electronic device and adjusting a frame rate of a camera module in the camera-related application in proportion to the measured environmental illuminance.

14. The method of claim 13, further comprising:

adjusting a number of buffers allocated in the first memory for a camera-related operation of the electronic device according to the adjusted frame rate.

15. The method of claim 11, further comprising:

identifying an operating mode of the camera-related application; and if the identified operating mode is a continuous shooting mode, setting a continuous shooting speed or a number of frames to execute continuous shooting according to an environmental illuminance measured by at least one of an available amount of the first memory and a sensor of the electronic device.

16. The method of claim 15, further comprising:

if the identified operating mode is a panorama shooting mode, adjusting a resolution of an image captured according to at least one of an available amount of the first memory and the measured environmental illuminance.

17. The method of claim 10, further comprising:

in response to detecting a user input activating the camera-related application, identifying the available amount of the first memory for activating the camera-related application;

generating a plurality of threads when the camera-related application is activated and processing the plurality of threads in parallel if the available amount of the first memory is greater than or equal to a predetermined third reference value; and processing at least one portion of the plurality of threads sequentially according to a predetermined processing reference value if the available amount of the first memory is less than the predetermined third reference value.

18. The method of claim 17, wherein processing the at least one portion of the plurality of threads sequentially comprises determining an order of execution for the plurality of threads according to a memory amount utilized for processing each of the plurality of threads.

19. A non-transitory recording media readable by a computer storing at least one program including instructions executable by a processor to:

identify, in response to execution of a camera-related application, an available amount of a first memory storing data relating to applications installed in an electronic device, and compare the available amount of the first memory to a predetermined first reference value to determine when to decode an image related to an execution screen of the camera-related application, and map the decoded image onto a second memory, relative to a user input, wherein when the available amount is greater than predetermined first reference value, the image is decoded prior to receiving a user input, and when the available amount is less than the predetermined first reference value, the image is decoded after receiving the user input.

* * * * *